United States Patent [19]

Ichimura et al.

[11] Patent Number: 4,778,829

[45] Date of Patent: Oct. 18, 1988

[54] PROCESS FOR PREPARING PRE-EXPANDED PARTICLES OF THERMOPLASTIC RESIN

[75] Inventors: Tadayuki Ichimura, Kakogawa; Kenichi Senda, Hirakata; Masao Ando, Toyonaka; Hirofumi Maeda, Takatsuki, all of Japan

[73] Assignee: Kanegafuchi Kagaku Kogyo Kabushiki Kaisha, Osaka, Japan

[21] Appl. No.: 84,058

[22] Filed: Aug. 11, 1987

Related U.S. Application Data

[63] Continuation-in-part of Ser. No. 880,448, Jun. 30, 1986, abandoned.

[30] Foreign Application Priority Data

Jul. 12, 1985 [JP] Japan .................. 60-154534
Aug. 12, 1986 [JP] Japan .................. 61-188811

[51] Int. Cl.$^4$ .............................................. C08J 9/22
[52] U.S. Cl. ........................................ 521/58; 521/56; 521/59; 521/60
[58] Field of Search ................. 521/58, 56, 59, 60

[56] References Cited

U.S. PATENT DOCUMENTS

| | | | |
|---|---|---|---|
| 3,832,430 | 8/1974 | Noziere . | |
| 4,436,840 | 3/1984 | Akiyama et al. | 521/58 |
| 4,443,393 | 4/1984 | Akiyama et al. | 521/58 |
| 4,448,901 | 5/1984 | Senda et al. | 521/58 |
| 4,464,484 | 8/1984 | Yoshimura et al. | 521/58 |
| 4,504,601 | 3/1985 | Kwabara et al. | 521/58 |
| 4,540,718 | 9/1985 | Senda et al. | 521/58 |
| 4,568,608 | 2/1986 | Kuwabara et al. | 521/58 |
| 4,587,270 | 5/1986 | Kuwabara et al. | 521/58 |
| 4,602,047 | 7/1986 | Endo et al. | 521/58 |
| 4,617,322 | 10/1986 | Senda et al. | 521/58 |
| 4,626,555 | 12/1986 | Endo et al. | 521/58 |
| 4,689,351 | 8/1987 | Endo et al. | 521/58 |

FOREIGN PATENT DOCUMENTS

| | | |
|---|---|---|
| 0140059 | 5/1985 | European Pat. Off. . |
| 2107683 | 8/1972 | Fed. Rep. of Germany . |
| 1335318 | 7/1963 | France . |
| 1600486 | 7/1970 | France . |
| 56-1344 | 1/1981 | Japan . |
| 58-199125 | 11/1983 | Japan . |
| 59-187036 | 10/1984 | Japan . |
| 60-10047 | 3/1985 | Japan . |

*Primary Examiner*—Morton Foelak
*Attorney, Agent, or Firm*—Armstrong, Nikaido, Marmelstein & Kubovcik

[57] ABSTRACT

A process for preparing pre-expanded particles of a thermoplastic resin, which comprises heating an aqueous dispersion of thermoplastic resin particles containing a volatile blowing agent to a high temperature under pressure in a pressure vessel, and releasing the dispersion into an atmosphere maintained at a lower pressure than the pressure in the pressure vessel and at a temperature of not lower than 40° C. According to the process of the present invention, there can be obtained pre-expanded thermoplastic resin particles with a large average diameter of cells. By molding the pre-expanded particles obtained by the present invention, molded articles which are small in dimensional shrinkage and excellent in surface appearance can be obtained without imparting expandability to the particles or aging the particles under pressure prior to molding.

12 Claims, 1 Drawing Sheet

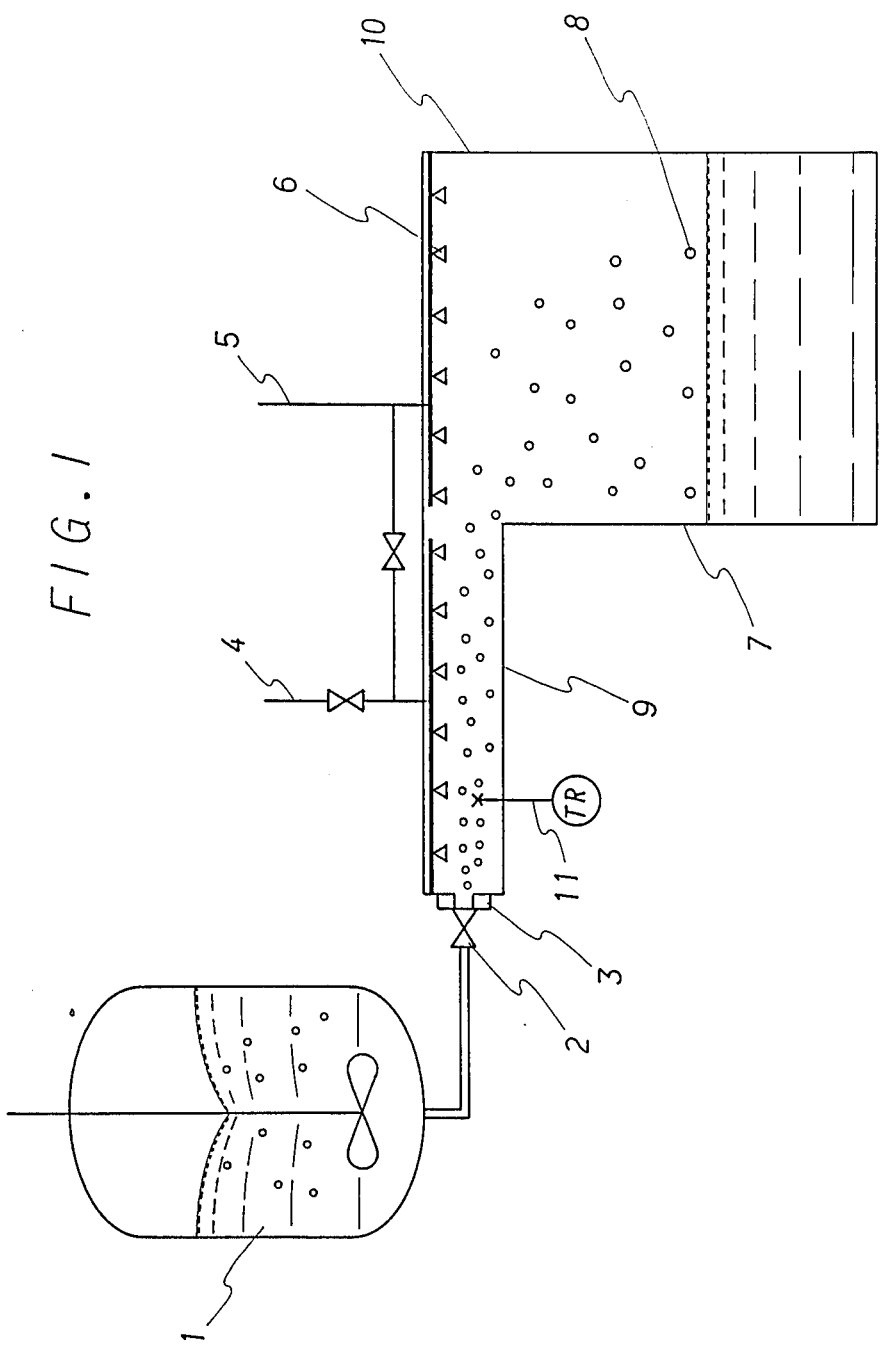

PROCESS FOR PREPARING PRE-EXPANDED PARTICLES OF THERMOPLASTIC RESIN

CROSS-REFERENCE TO RELATED APPLICATION

This is a continuation-in-part of application Ser. No. 880,448 filed on June 30, 1986 now abandoned.

BACKGROUND OF THE INVENTION

The present invention relates to a process for preparing pre-expanded particles of a thermoplastic resin. More particularly, the invention relates to a process for preparing pre-expanded thermoplastic resin particles which are applicable, without further imparting expandability to the pre-expanded particles prior to molding, to a process for producing foams by heating pre-expanded particles with a heating medium such as steam in a mold which is able to be closed but unable to be sealed, in other words, in a mold which is able to be closed but is permeable to a fluid heating medium.

As a process for pre-expanding particles of a thermoplastic resin, there are, for example, a process disclosed in DE-OS No. 2,107,683 and a process disclosed in Japanese Examined patent publication No. 56-1344, and the like. According to the processes, pre-expanded particles of a thermoplastic resin are obtained and they can be used for molding in a mold.

The cell diameter of the pre-expanded thermoplastic resin particles obtained by means of these processes is, however, usually 200 $\mu$m or less, and it is difficult to control the cell diameter of the particles. Japanese Unexamined patent publication No. 58-199125 discloses decreasing the diameter of cells of pre-expanded particles by using an inorganic fine powder such as talc or silica, but no technique for incresasing the diameter of cells has been known.

In case that the cell diameter of pre-expanded particles is too small, it is necessary, prior to molding the pre-expanded particles, to further impart expandability to the pre-expanded particles (Japanese Unexamined patent publication No. 59-187036) or to conduct aging the particles under pressure (Japanese Examined patent publication No. 60-10047). Conducting such operations makes the process complicated and causes economic disadvantage. Further, even when the above operations are conducted, there remains a problem that the range of allowable molding condition is still very narrow.

An object of the present invention is to provide a process for preparing pre-expanded particles of a thermoplastic resin, by which pre-expanded particles having a large cell diameter can be obtained.

This and other objects of the present invention will become apparent from the description hereinafter.

SUMMARY OF THE INVENTION

As a result of continuous studies of the present inventors, it has been found that the cell diameter of the pre-expanded particles of thermoplastic resin can be made large by, upon releasing an aqueous dispersion containing thermoplastic resin particles and a blowing agent maintained at a high temperature under high pressure in a pressure vessel into a lower pressure atmosphere than the pressure in the vessel to pre-expand the thermoplastic resin particles, releasing the dispersion into the low pressure atmosphere at a temperature of not lower than 40° C.

In accordance with the present invention, there is provided a process for preparing pre-expanded particles of a thermoplastic resin, which comprises heating an aqueous dispersion of thermoplastic resin particles containing a volatile blowing agent to a high temperature under pressure in a pressure vessel, and releasing the dispersion into an atmosphere maintained at a lower pressure than the pressure in the pressure vessel and at a temperature of not lower than 40° C.

According to the process of the present invention, there can be obtained pre-expanded particles with an average diameter of cells of not less than 200 $\mu$m. By molding the pre-expanded particles obtained by the process of the present invention in a mold, molded articles which are small in shrinkage, and excellent in surface appearance can be obtained without imparting expandability to the pre-expanded particles or aging the particles under pressure prior to molding.

BRIEF DESCRIPTION OF THE DRAWING

FIG. 1 is an illustrative view showing an embodiment of the preparation of the pre-expanded particles of the present invention.

DETAILED DESCRIPTION

Examples of the thermoplastic resin used in the invention are, for instance, styrene polymers such as polystyrene, poly-$\alpha$-methylstyrene, a copolymer of styrene and maleic anhydride, a blend of polyphenyleneoxide and polystyrene, a graft-copolymer of polyphenyleneoxide and polystyrene, a copolymer of acrylonitrile and styrene, a terpolymer of acrylonitrile, butadiene and styrene, a copolymer of styrene and butadiene, and a high impact polystyrene; vinyl chloride polymers such as polyvinyl chloride, a copolymer of vinyl chloride and vinyl acetate, a chlorinated polyvinyl chloride, and a copolymer of an olefin such as ethylene or propylene and vinyl chloride; polyamides, polyester resins, polyolefin resins, and the like.

When using the polyolefin resins, which have a high gas permeability and a glass transition temperature equal to or lower than room temperature and the molded articles therefrom obtained by molding in a mold tend to shrink and deform, the present invention is useful.

Examples of the polyolefin resins are, for instance, polypropylene resins such as a random copolymer of ethylene and propylene, a random terpolymer of ethylene, propylene and butene, a block copolymer of ethylene and propylene and homopolypropylene, polyethylene resins such as a low density polyethylene, a medium density polyethylene, a high density polyethylene, a linear low density polyethylene, a copolymer of ethylene and vinyl acetate, a copolymer of ethylene and methyl methacrylate, an ionomer resin such as an ionomer resin which is an ethylene-methacrylic acid copolymer intermolecularly crosslinked with a metal ion; other polyolefin resins such as poly-1-butene, polypentene, a terpolymer of ethylene, acrylic acid and maleic anhydride; and the like. The polyolefin resins may be used in the state of not only a non-crosslinked resin but also a crosslinked resin prepared by using peroxide or radiation.

The thermoplastic resins may be used alone or as an admixture thereof.

The non-crosslinked linear low density polyethylene (non-crosslinked LLDPE) used in the present invention is a copolymer of ethylene and a C$_4$ to C$_{10}$ $\alpha$-olefin having a melting point of 115° to 130° C., a density of 0.915 to 0.940 g/cm³ and a melt index (MI) of 0.1 to 5 g/10 min. LLDPE and a process for the preparation thereof are known in the field of synthetic resins.

Examples of the α-olefin having 4 to 10 carbon atoms used as a comonomer are, for instance, 1-butene, 1-pentene, 1-hexene, 3,3-dimethyl-1-butene, 4-methyl-1-pentene, 4,4-dimethyl-1-pentene, 1-octene, and the like. The α-olefins may be used alone or as an admixture thereof. The content of the α-olefin comonomer in the copolymer which ensures that the density of the copolymer is within the above range is usually from about 3 to about 12% by weight.

When the melting point of the copolymer is less than 115° C., the obtained foams are insufficient in heat resistance. When the melting point is more than 130° C., the properties of LLDPE are close to those of a high density polyethylene and consequently the molding is difficult.

The copolymer having a density of less than 0.915 g/cm³ does not provide moldings having a high expansion ratio because of lack in rigidity of the resin. When the density of the copolymer is more than 0.940 g/cm³, the impact resistance is bad, so the obtained foams become fragile, and also the copolymer approaches a high density polyethylene and is molded with difficulty.

When the melt index of the copolymer is less than 0.1 g/10 min., the copolymer is poor in fluidity in pre-expansion and accordingly it is difficult to achieve a high expansion ratio, and also the smoothness of the surface of moldings is lowered. On the other hand, when the melt index is more than 5 g/10 min., the fluidity becomes too large, so open cells are easy to be formed and also the diameter of the cells easily becomes nonuniform.

The melting point of the copolymer as shown herein is a value measured by using a differential scanning calorimeter (DSC) and indicates a peak temperature in the endothermic curve obtained by raising the temperature of a polymer to 200° C. at a rate of 10° C./minute, cooling it to room temperature at a rate of 10° C./minute to crystallize it, and then heating it again at a rate of 10° C./minute. The density of the copolymer as shown herein is a value measured according to Japanese Industrial Standard (JIS) K 6760 (method D in JIS K 7112). The melt index as shown herein is a value measured according to JIS K 6760 (JIS K 7210, 190° C., 2.16 kg load).

The thermoplastic resins used in the present invention may contain additives such as a heat stabilizer, ultraviolet absorber, antistatic agent, flame retarder, coloring agent, inorganic powder and other usual additives, as occasion demands.

Hydrocarbons and halogenated hydrocarbons having a boiling point of −50° to 120° C. are used in the present invention as volatile blowing agents. Examples of the hydrocarbon and halogenated hydrocarbon blowing agents are, for instance, propane, butane, pentane, hexane, heptane, cyclopentane, cyclohexane, monochloromethane, dichloromethane, monochloroethane, trichloromonofluoromethane, dichlorodifluoromethane, dichloromonofluoromethane, trichlorotrifluoroethane, dichlorotetrafluoroethane, and the like. The blowing agents may be used alone or as an admixture thereof. The blowing agents are incorporated into the thermoplastic resin in an amount of 5 to 40 parts by weight per 100 parts by weight of the thermoplastic resin. The amount of the volatile blowing agent used is selected so that the content of the blowing agent in the resin falls within the above range, giving consideration to the kind of the blowing agent, desired expansion ratio, ratio of the volume of particles to the volume of space in a pressure vessel, etc. in the preparation of the pre-expanded particles wherein the polymer particles and the blowing agent are dispersed in water in the presence of a dispersing agent in a pressure vessel, maintained under high temperature and pressure conditions and released into a low pressure atmosphere.

The dispersing agent is used for preventing the resin particles from agglomerating with each other. Examples of the dispersing agent are, for instance, a water-soluble polymer such as polyvinyl alcohol, methyl cellulose or poly-N-vinyl pyrrolidone, and a powder of a water-insoluble or slightly water-soluble inorganic material such as calcium phosphate, magnesium pyrophosphate, zinc carbonate, titanium dioxide or aluminum oxide. In case of using the inorganic powder, it is preferable to use a slight amount of a surface active agent as a dispersing assistant, e.g. anionic surface active agent such as sodium alkylbenzenesulfonate, sodium α-olefinsulfonate or sodium alkylsulfonate, in order to decrease the amount of the inorganic powder so that the pre-expanded particles are well fused together on heating for molding. Usually, the amounts of the inorganic powder and the anionic surface active agent are from 0.1 to 3 parts by weight and 0.001 to 0.5 part by weight, respectively, per 100 parts by weight of the thermoplastic resin particles. The water-soluble polymer is employed usually in an amount of 0.1 to 5 parts by weight per 100 parts by weight of the thermoplastic resin particles.

The amount of the thermoplastic resin particles to be dispersed in water is preferably from 10 to 100 parts by weight per 100 parts by weight of water from the viewpoint of good productivity, good dispersion stability and utility cost reduction.

The heating temperature in pre-expansion varies depending on the kinds of thermoplastic resin and volatile blowing agent and the desired expansion ratio, and is within the range of −25° to +10° C., preferably −20° to +5° C., of the glass transition temperature of the thermoplastic resin or, in case of crystalline polymers, the melting point of the thermoplastic resin. For example, if polyethylene having the melting point of 120° C. is used, the heating temperature for the aqueous dispersion of the thermoplastic resin particles in the pressure vessel is selected from 95° to 130° C. When the heating temperature is lower than the above range, the expansion ratio is remarkably lowered, and when the heating temperature is higher than the above range, the number of closed cells in the resulting pre-expanded particle is decreased.

The volatile blowing agent can be impregnated in the thermoplastic resin particles in a usual manner, for example, by agitating the dispersion in the pressure vessel within the above temperature range, thereby bringing the polymer particles into contact with the blowing agent. At that time, the pressure in the vessel is maintained at a pressure equal to or higher than the vapor pressure that the volatile blowing agent indicates at the heating temperature.

The thus obtained mixture of the thermoplastic resin particles containing the blowing agent and water is released into a low pressure atmosphere where the pressure is lower than that in the pressure vessel and a temperature is equal to or higher than 40° C., to give pre-expanded particles having a large cell diameter. Heating the low pressure atmosphere to a temperature equal to or higher than 40° C. can be achieved, for instance, by spraying or injecting hot water of 40° to 90° C. from a plurality of nozzles having small holes, or by introducing steam into the low pressure atmosphere. In order to obtain the pre-expanded particles having a larger cell diameter, steam having higher temperature than hot water is used, since the temperature of the low pressure atmosphere is raised up to 90° C. by using hot water. In such a case, it is necessary to wash the pre-expanded particles with hot water after their coming into contact with steam to remove the dispersing agent adhered to the particles. Accordingly, it is preferable to combine the above-stated two methods. That is, the mixture is brought into contact with an atmosphere in which steam is introduced and then brought into contact with an atmosphere in which hot water of 40° to 90° C. is sprayed or injected from a plurality of nozzles having small holes to wash the pre-expanded particles as well as to form the particles having a large cell diameter.

Referring to FIG. 1 which shows one embodiment of the preparation of pre-expanded particles, thermoplastic resin particles are dispersed in water in a pressure vessel, and a blowing agent is introduced into the vessel with agitation. The temperature is elevated, and the resulting dispersion 1 is agitated for a prescribed period of time under high temperature and pressure conditions to incorporate the blowing agent into the particles. The aqueous dispersion 1 is then released through an orifice 3 into a chamber 7 which is maintained at a pressure lower than that in the pressure vessel and in which a plurality of spray nozzles 6 are arranged in a zone in a neighborhood of the orifice and at a level higher than the orifice. Hot water or steam fed through line 4 and hot water fed through line 5 are sprayed to the released particles 8 which are being expanded in the chamber to produce pre-expanded particles of the thermoplastic resin.

The term "a pressure lower than the pressure in the pressure vessel" used in the present specification means a pressure which is lower than the pressure in a pressure vessel equal to or higher than the vapor pressure that the volatile blowing agent indicates at the heating temperature. Usually, a pressure around atmospheric pressure is employed. The term "atmosphere" used in the present specification means a space including the loci where the mixture of the particles and water is scattered.

When the temperature of the low pressure atmosphere is lower than 40° C., it is hard to obtain the pre-expanded particles having a large diameter of cells. On the other hand, when the temperature of the low pressure atmospheric is so high as to be around the glass transition temperature of the thermoplastic resin or, in case of crystalline polymers, the melting point of the thermoplastic resin, the cells of the pre-expanded particles are broken or the particles are shrinked. Therefore, the preferable range of the temperature of the low pressure atmosphere is from 40° to 120° C.

The reason why pre-expanded particles having a large average diameter of cells can be obtained in the low pressure atmosphere of a temperature equal to or higher than 40° C. is considered to be that in such an atmosphere of the temperature equal to or higher than 40° C., the resin particles are not suddenly cooled, and therefore the expansion ratio of the pre-expanded particles can be increased. Consequently, the amount of the blowing agent required for obtaining the particles with a desired expansion ratio can be decreased.

It is considered that by making the average cell diameter large as mentioned above, membranes surrounding the gas cells become thick and the release of the gas in the cells during heating for molding is decreased, thus shrinkage of moldings owing to reduction of pressure in the cells can be prevented.

The expansion ratio of the thermoplastic resin pre-expanded particles of the invention varies depending on the purposes, density of the thermoplastic resin used, and the like. When using polyethylene, preferably it is from 10 to 40. For example, when moldings suitable as cushioning packaging materials are desired, the preferable expansion ratio of the pre-expanded particles of polyethylene is from 10 to 30. In that case, if polyethylene having a density of 0.920 g/cm$^3$ is used as a raw material, the density of the pre-expanded particles is from about 0.092 to about 0.031 g/cm$^3$.

A molded article can be formed from the obtained pre-expanded particles without imparting expandability to the pre-expanded particles or aging the pre-expanded particles under pressure prior to molding. For example, immediately after preparing the pre-expanded particles, or after aging the obtained pre-expanded particles for an appropriate period of time and drying, the pre-expanded particles are charged in a mold which is able to be closed but is unable to be hermetically closed, and are heated with a fluid heating medium such as steam at a temperature of about 105° to about 140° C. for about 3 seconds to about 2 minutes.

The pre-expanded particles according to the present invention may be molded by a usual process as mentioned above after imparting expandability to the pre-expanded particles or after aging the pre-expanded particles under pressure, as occasion demands.

The pre-expanded particles obtained by the process of the present invention can be easily molded in a mold because the range of heating condition for molding is wide, and provide molded articles which are small in shrinkage and excellent in surface appearance, do not show sink or strain of shape, and have an excellent fusibility.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLES 1 TO 3

A non-crosslinked linear low density polyethylene (non-crosslinked LLDPE) prepared by copolymerization of ethylene and 1-butene and having a melting point of 120° C., a melt index of 1.1 g/10 min., a density of 0.920 g/cm$^3$, a ratio of weight average molecular weight to number average molecular weight (Mw/Mn) of 5.1 measured by gel permeation chromatography, and a weight average molecular weight of $8.9 \times 10^4$, to which 0.008% of talc was added, was pelletized using an extruder.

A 1,000 liter pressure vessel equipped with a stirrer was charged with 100 parts (225 kg) of the obtained polymer pellets having a weight of 4.5 mg/pellet, 1.0 part of basic calcium tertiary phosphate powder as a dispersing agent and 0.006 part of sodium $C_{14}$–$C_{16}$ n-paraffin sulfonate, and 300 parts of water, and they were stirred. To the resulting aqueous dispersion was added 40 to 45 parts of dichlorodifluoromethane with stirring, and the temperature of the dispersion was raised to 116° C. At that time, the inner pressure of the vessel was adjusted to 27 to 29 kg/cm$^2$G (gauge pressure, hereinafter the same) to control the expansion ratio.

As shown in FIG. 1, through a line 4 for feeding hot water or steam and a line 5 for feeding hot water, hot water was sprayed from spray nozzle 6 into a front part 9 of an expansion chamber 7 and a back part 10 of the expansion chamber 7 to adjust the temperature of the atmosphere of front part 9 of the expansion chamber 7 to a temperature shown in Table 1. Then, the aqueous dispersion 1 was released through a single circular orifice having an inside diameter of 4 mm in an orifice plate 3 provided after a releasing valve 2 attached at a lower part of the pressure vessel. In FIG. 1, 11 shows a temperature recorder. The thus obtained pre-expanded particles 8 had an average expansion ratio of 21 to 23.

The pre-expanded particles 8 were dried at 35° C. for 6 hours, and filled in a mold having a single cavity of 900 mm × 600 mm × 60 mm in size attached to a molding machine. The particles were heated for 15 to 20 seconds by steam of 0.6 to 2.0 kg/cm$^2$G to fuse together. After cooling, the molded article was taken out of the mold, aged at 80° C. for 20 hours and dried. After conditioning the obtained molded article at room temperature for 24 hours, properties of the molded articles, i.e. average cell diameter of the pre-expanded particles, dimensional stability, smoothness, shrinkage or camber, fusibility of the molded article and allowable molding condition are examined as follows: The results are shown in Table 1.

(Average cell diameter)

There are randomly picked up 30 pieces of pre-expanded particles from the obtained pre-expanded particles and the average cell diameter is measured according to Japanese Industrial Standard (JIS) K 6402.

(Dimensional stability)

Dimensional stability of the molded article is estimated from the dimensional shrinkage calculated from the dimensions of the molded article and the dimensions of the mold.

O: The dimensional shrinkage is less than 4%
Δ: The dimensional shrinkage is from 4 to 6%
X: The dimensional shrinkage is more than 6%

(Smoothness)

The surface of the molded article is observed with the naked eye.

O: The surface is smooth
Δ: The surface is nearly even
X: The surface is uneven (Shrinkage or chamber)

The surface of the molded article is observed with the naked eye whether there is observed shrinkage ior chamber or not.

O: There is observed no shrinkage or chamber.
Δ: There is few shrinkage or chamber.
X: Shrinkage or chamber is observed remarkably (Fusibility)

Fusibility of the molded article is estimated from the fusion percentage of the particles in the molded article.

O: More than 60%
Δ: From 40 to 60%
X: Less than 40%

(Allowable molding condition)

The molding is carried out by using steam having a pressure range of 0.6 to 2.0 kg/cm$^2$G. A steam pressure range capable of giving a molded article having the estimations of O or Δ in all of the dimensional shrinkage, the smoothness, the shrinkage or camber and the fusibility is defined as a proper steam pressure range in molding. The allowable molding condition is estimated as follows:

O: The proper steam pressure range is more than 0.15 kg/cm$^2$G.
Δ: The proper steam pressure range is from 0.05 to 0.15 kg/cm$^2$G.
X: The proper steam pressure range is loss than 0.05 kg/cm$^2$G.

Comparative Example 1

The procedure of Example 1 was repeated except that the temperature of the atmosphere of the front part 9 in the chamber 7 was lowered as shown in Table 1. The results are shown in Table 1.

TABLE 1

| Ex. No. | Temperature of the front part in the expansion chamber (°C.) | Average expansion ratio | Average cell diameter of the pre-expanded particles (μm) | Properties of the molded article | | | | |
|---|---|---|---|---|---|---|---|---|
| | | | | Dimensional stability | Smoothness | Shrinkage or camber | Fusibility | Allowable molding condition |
| 1 | 40 | 21 | 200 | Δ | O | Δ | O | O |
| 2 | 60 | 22 | 220 | O | O | O | O | O |
| 3 | 80 | 22 | 220 | O | O | O | O | O |
| Com Ex. 1 | 20 | 23 | 100 | X | Δ | X | O | X |

EXAMPLE 4

The pre-expanded particles were prepared in the same manner as in Example 1 except that steam fed through the line 4 was sprayed from the spray nozzles 6 into the front part 9 of the expansion chamber 7 to raise the temperature of the atmosphere of the front part 9 in the chamber 7 to 105° C. and hot water of 20° C. fed through the line 5 was sprayed from the spray nozzles 6 into the back part 10 of the expansion chamber 7.

The pre-expanded particles were subjected to molding in the same manner as in Example 1.

The properties of the molded article were as satisfactory as in Examples 1 to 3. The results are shown in Table 2.

EXAMPLE 5

The pre-expanded particles were prepared in the same manner as in Example 1 except that steam fed through the line 4 was sprayed from the spray nozzles 6 into the front part 9 of the expansion chamber 7 to raise the temperature of the atmosphere of the front part 9 in the chamber 7 to 105° C. and hot water of 60° C. fed through the line 5 was sprayed from the spray nozzles 6 into the back part 10 of the expansion chamber 7.

The pre-expanded particles were subjected to molding in the same manner as in Example 1.

The properties of the molded article were as satisfactory as in Examples 1 to 3. The results are shown in Table 2.

Comparative Example 2

The procedure of Example 1 was repeated except that steam fed through the line 4 was sprayed from the spray nozzles 6 into the front part 9 of the chamber 7 to raise the temperature of the atmosphere of the front part 9 to 125° C. and hot water of 20° C. fed through the line 5 was sprayed from the nozzles 6 into the back part 10 of the chamber 7. The obtained pre-expanded particles could not be subjected to molding because only broken or shrunk pre-expanded particles could be obtained.

Comparative Example 1 except that a non-crosslinked LLDPE prepared from a LLDPE having a density of 0.93 g/cm³ and the olefin comonomers shown in Table 3 was used. The results are shown in Table 3.

TABLE 3

| Ex. No. | Density (g/cm³) | Comonomer | Melt index (g/10 minutes) | Melting point (°C.) | Heating temperature (°C.) | Inner pressure of the pressure vessel (kg/cm²G) |
|---|---|---|---|---|---|---|
| 6 | 0.930 | 4-methyl pentene | 2.1 | 122 | 118 | 29 |
| 7 | 0.930 | 1-octene | 1.1 | 126 | 120 | 30 |
| 8 | 0.930 | 1-butene | 0.5 | 123 | 118 | 29.5 |
| Com. Ex. 3 | 0.930 | 4-methyl pentene | 2.1 | 122 | 118 | 29 |
| Com. Ex. 4 | 0.930 | 1-octene | 1.1 | 126 | 120 | 30 |
| Com. Ex. 5 | 0.930 | 1-butene | 0.5 | 123 | 118 | 30.5 |

| | | | Properties of the molded article | | | | |
|---|---|---|---|---|---|---|---|
| Ex. No. | Average expansion ratio | Average cell diameter (μm) | Dimensional stability | Smoothness | Shrinkage or camber | Fusibility | Allowable molding condition |
| 6 | 33 | 180 | O | O | O | O | O |
| 7 | 31 | 200 | O | O | O | O | O |
| 8 | 32 | 200 | O | O | O | O | O |
| Com. Ex. 3 | 33 | 70 | X | Δ | X | O | X |
| Com. Ex. 4 | 31 | 110 | X | Δ | X | O | X |
| Com. Ex. 5 | 32 | 100 | X | Δ | X | O | X |

TABLE 2

| Ex. No. | Temperature of the front part in the expansion chamber (°C.) | Average expansion ratio | Average cell diameter of the pre-expanded particles (μm) | Properties of the molded article | | | | |
|---|---|---|---|---|---|---|---|---|
| | | | | Dimensional stability | Smoothness | Shrinkage or camber | Fusibility | Allowable molding condition |
| 4 | 105 | 21 | 250 | O | O | O | O | O |
| 5 | 105 | 22 | 300 | O | O | O | O | O |
| Com. Ex. | 125 | 22 | The obtained pre-expanded particles could not be subjected to molding. | | | | | X |

EXAMPLES 6 TO 8

Pre-expanded particles of non-crosslinked LLDPE were prepared and molded in the same manner as in Example 5 except that a non-crosslinked LLDPE prepared from a LLDPE having a density of 0.93 g/cm³ and an α-olefin comonomer shown in Table 3 was used. The results are shown in Table 3.

Comparative Examples 3 to 5

Pre-expanded particles of non-crosslinked LLDPE were prepared and molded in the same manner as in

EXAMPLE 9

Comparative Example 6

A 1000 ml pressure vessel equipped with a stirrer was charged with 100 parts (225 kg) of pellets of a random copolymer of ethylene and propylene (commercially available under the trade name "Noblen" made by Sumitomo Kagaku kogyo Kabushiki Kaisha, ethylene content: 4.5%, a weight: about 1.3 mg/pellet), 1.0 part of basic calcium tertiary phosphate powder as a dispersing agent, 0.006 part of sodium n-paraffinic sulfonate and 300 parts of water, and the temperature of the aqueous dispersion was raised to 136° C. while 24 to 26 parts of dichlorodifluoromethane was added thereto with stirring. At that time, the inner pressure of the vessel was adjusted to 24 to 26 kg/cm³G to control the expansion ratio.

Then, the pre-expanded particles were prepared and subjected to the molding in the same manner as in Example 5 (Example 9) or Comparative Example 1 (Comparative Example 6). The results are shown in Table 4.

TABLE 4

| Ex. No. | Temperature of the front part of the expansion chamber (°C.) | Inner pressure of the pressure vessel (kg/cm$^2$G) | Average expansion ratio | Average cell diameter of the pre-expanded particles (μm) | Properties of the molded article ||||| |
|---|---|---|---|---|---|---|---|---|---|
| | | | | | Dimensional stability | Smoothness | Shrinkage or camber | Fusibility | Allowable molding condition |
| 9 | 105 | 24 | 20 | 300 | O | O | Δ | O | O |
| Com. Ex. 6 | 20 | 26 | 21 | 175 | X | Δ | X | Δ | X |

According to the process of the present invention, there can be obtained the pre-expanded thermoplastic resin particles having the cell diameter of more than 200 μm. Therefore, the particles according to the present invention can give molded articles having excellent properties such as a small dimensional shrinkage or excellent appearance without imparting expandability to the pre-expanded particles prior to molding or without aging the pre-expanded particles under pressure.

In addition to the ingredients used in the Examples, other ingredients can be used in the Examples as set forth in the specification to obtain substantially the same results.

What we claim is:

1. A process for preparing pre-expanded particles of a thermoplastic resin, which comprises heating an aqueous dispersion of thermoplastic resin particles containing a volatile blowing agent to a high temperature under pressure in a pressure vessel, and releasing said dispersion into an atmosphere maintained at a lower pressure than the pressure in the pressure vessel and at a temperature of not lower than 40° C.

2. A process for preparing pre-expanded particles of a thermoplastic resin, which comprises heating an aqueous dispersion of thermoplastic resin particles containing a volatile blowing agent to a high temperature under pressure in a pressure vessel, and releasing said dispersion into an atmosphere maintained at a lower pressure than the pressure in the pressure vessel and at a temperature of not lower than 40° C.; said thermoplastic resin being a member selected from the group consisting of a styrene polymer, a vinyl chloride polymer, a polyamide, a polyester resin, a polypropylene resin, a low density polyethylene, a medium density polyethylene, a high density polyethylene, a crosslinked linear low density polyethylene, a copolymer of ethylene and vinyl acetate, a copolymer of ethylene and methyl methacrylate, an ionomer resin, poly-1-butene, polypentene, and a terpolymer of ethylene, acrylic acid and maleic anhydride.

3. A process for preparing pre-expanded particles of a thermoplastic resin, which comprises heating an aqueous dispersion of thermoplastic resin particles containing a volatile blowing agent to a high temperature under pressure in a pressure vessel, and releasing said dispersion into an atmosphere maintained at a lower pressure than the pressure in the pressure vessel and at a temperature of not lower than 40° C., said thermoplastic resin being a non-crosslinked linear low density polyethylene.

4. The process of claim 1, wherein said atmosphere is an atmosphere in which hot water of 40° to 90° C. is sprayed or injected from a plurality of nozzles having small holes.

5. The process of claim 2, wherein said atmosphere is an atmosphere in which hot water of 40° to 90° C. is sprayed or injected from a plurality of nozzles having small holes.

6. The process of claim 3, wherein said atmosphere is an atmosphere in which hot water of 40° to 90° C. is sprayed or injected from a plurality of nozzles having small holes.

7. The process of claim 1, wherein said atmosphere is an atmosphere in which steam is introduced.

8. The process of claim 2, wherein said atmosphere is an atmosphere in which steam is introduced.

9. The process of claim 3, wherein said atmosphere is an atmosphere in which steam is introduced.

10. The process of claim 1, wherein said dispersion is brought into contact with an atmosphere in which steam is introduced and then brought into contact with an atmosphere in which hot water of 40° to 90° C. is sprayed or injected from a plurality of nozzles having small holes.

11. The process of claim 2, wherein said dispersion is brought into contact with an atmosphere in which steam is introduced and then brought into contact with an atmosphere in which hot water of 40° to 90° C. is sprayed or injected from a plurality of nozzles having small holes.

12. The process of claim 3, wherein said dispersion is brought into contact with an atmosphere in which steam is introduced and then brought into contact with an atmosphere in which hot water of 40° to 90° C. is sprayed or injected from a plurality of nozzles having small holes.

* * * * *